(12) United States Patent
Waggoner

(10) Patent No.: US 11,445,211 B1
(45) Date of Patent: Sep. 13, 2022

(54) PSYCHOVISUALLY OPTIMIZED DITHERING FOR IMAGE AND VIDEO ENCODING

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/118,342

(22) Filed: Dec. 10, 2020

(51) Int. Cl.
| | | |
|---|---|---|
| H04N 19/517 | (2014.01) | |
| H04N 19/172 | (2014.01) | |
| H04N 19/186 | (2014.01) | |
| H04N 19/136 | (2014.01) | |
| H04N 19/182 | (2014.01) | |

(52) U.S. Cl.
CPC ......... *H04N 19/517* (2014.11); *H04N 19/136* (2014.11); *H04N 19/172* (2014.11); *H04N 19/182* (2014.11); *H04N 19/186* (2014.11)

(58) Field of Classification Search
CPC .. H04N 19/517; H04N 19/136; H04N 19/182; H04N 19/172; H04N 19/186
See application file for complete search history.

(56) References Cited

U.S. PATENT DOCUMENTS

| | | | | |
|---|---|---|---|---|
| 2010/0321583 | A1* | 12/2010 | Shields | ..................... G06T 7/20 348/699 |
| 2017/0111645 | A1* | 4/2017 | Pettersson | ............... G06T 5/002 |
| 2017/0148371 | A1* | 5/2017 | Qian | ..................... H04N 1/405 |
| 2020/0288136 | A1* | 9/2020 | Fang | .................... H04N 19/146 |

FOREIGN PATENT DOCUMENTS

WO  WO-2019200658 A1 * 10/2019

\* cited by examiner

*Primary Examiner* — Tracy Y. Li
(74) *Attorney, Agent, or Firm* — Nicholson De Vos Webster & Elliott LLP

(57) ABSTRACT

Techniques for psychovisually optimized dithering for image and video (e.g., frame) encoding are described. According to some embodiments, a computer-implemented method includes receiving a request to encode a video from a first depth of pixel values to a second, different depth of pixel values at a content delivery service, detecting a flat region without texturing and a non-flat region with texturing in a first frame of the video having the first depth of pixel values, dithering pixel values in the non-flat region and flattening pixel values in the flat region, encoding the dithered pixel values and the flattened pixel values of the frame into a first encoded frame having the second, different depth of pixel values by the content delivery service, and transmitting the first encoded frame from the content delivery service to a viewer device.

17 Claims, 13 Drawing Sheets

US 11,445,211 B1

PSYCHOVISUALLY OPTIMIZED DITHERING FOR IMAGE AND VIDEO ENCODING

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
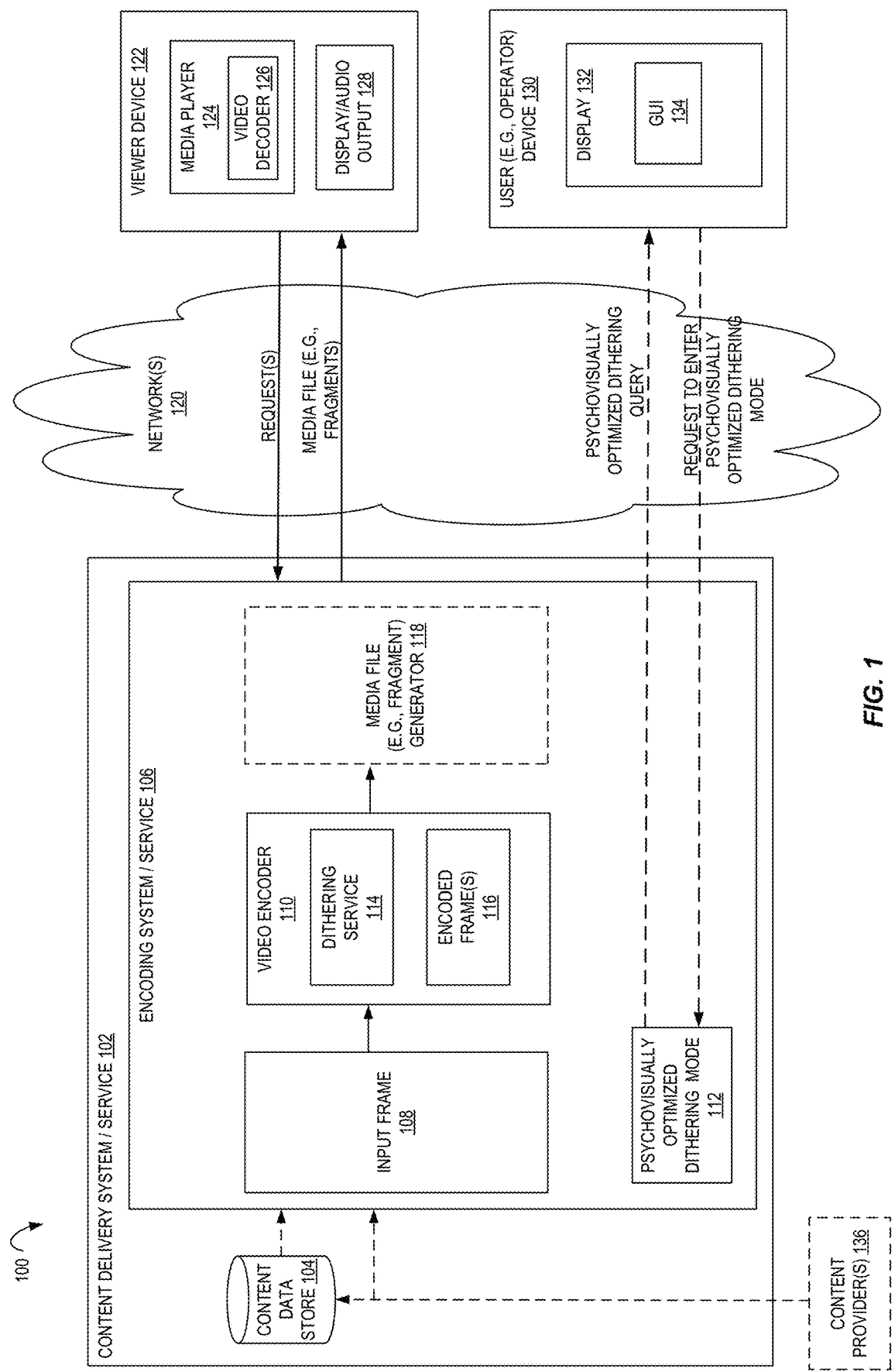
FIG. 1 is a diagram illustrating an environment including a content delivery system/service, having a video encoder with a dithering service including a psychovisually optimized dithering mode, to send the encoded media file to a viewer device according to some embodiments.

The present disclosure relates to methods, apparatus, systems, and non-transitory computer-readable storage media for psychovisually optimized dithering for image and video (e.g., frame) encoding. In certain embodiments, a content delivery system and/or service detects a flat region without texturing and a non-flat region with texturing in an image (e.g., frame of a video), and dithers pixel values in the non-flat region and flattens (e.g., does not dither) pixel values in the flat region. The pixel values may be luminance (e.g., luma component) values. Certain content (e.g., video and/or image) is encoded (e.g., by an encoding system/service) from a source format having a first depth of pixel values (e.g., 10-bits wide) to a deliverable format having a second, different depth of pixel values (e.g., 8-bits wide). For example, with a 10-bits wide (binary) number having 1024 possible values, but an 8-bits wide (binary) number having 256 possible values. In one embodiment, fewer than all values are utilized, e.g., 8-bits wide pixel values may be within a given range, for example, from 16 (e.g., "full black") to 235 (e.g., "full white"). However, the conversion from the source format having a first depth of pixel values (e.g., 10-bits wide) to the deliverable format having a second, different depth of pixel values (e.g., 8-bits wide) has large enough jumps that a seam can be seen between areas of pixels just one pixel value apart in certain embodiments. So, instead of truncating certain (e.g., 2) least significant bits of the (e.g., 10-bits) source, dithering algorithms are used in certain embodiments.

Various techniques for dithering exist. In certain embodiments, dithering is performed before any quantization (or re-quantization) process, in order to de-correlate the quantization noise from the input signal and to prevent non-linear behavior (e.g., distortion). In certain embodiments, quantization with lesser bit depth requires higher amounts of dither. In certain embodiments, the result of the process still yields distortion, but the distortion is of a random nature, so the resulting noise is, effectively, de-correlated from the intended signal.

For example, dithering such that if a plurality of 10-bit pixel values are 66 (e.g., where the value indicates the luminance), in converting to 8-bit (e.g., dividing by 4 such that the converted value is non-integer pixel value of 16.5), a proper subset (e.g., half) of those pixel values are converted to 16 and the remaining pixel values (e.g., the other half) are converted to 17.

This can work, but in a shallow gradient, such as a source going from a pixel value of 80 to a pixel value of 64 across the depth of the screen, certain integer pixel values (e.g., those values that convert to a modulus 4 (mod 4) number) do not get dithered, while non-integer (e.g., intermediate) values are dithered (e.g., the 16.5 pixel value in an 8-bit format discussed above). This can result in visible stripes where some areas are totally flat (e.g., mod 4) and others have texture due to adjacent pixels not being identical (e.g., non-mod 4). In certain embodiments, encoding (e.g., according to an encoding standard) does not support encoding non-integer pixel values.

Embodiments herein provide for a mode that preserves the psychovisual characteristics of a source. In certain embodiments, where a (e.g., 10-bit) source image (or frame) has a flat area without texturing (e.g., all the (e.g., luminance) pixel values are the same), a content delivery service/system (e.g., a dithering service thereof) rounds the source values to the same (e.g., nearest) integer (e.g., mod 4) value so that the output pixels will also be flat when in the psychovisually optimized dithering mode. In addition to creating a more accurate appearance, particularly for motion graphics and anime, the reduced random values make encoding more efficient, thus reducing the bitrate required for a given quality.

In certain embodiments where there is a gradient that would be visible with this rounding, or where the source had a subtle texture, dithering would be used for all converted pixels (e.g., even the converted pixels that are integer (e.g., mod 4) values), so as to retain the even distribution of texture across the screen. In certain embodiments, getting to full black (e.g., a 16 pixel value in an 8-bit depth format) or full white (e.g., a 235 pixel value in an 8-bit depth format), is generally preferable, so the rounding is biased towards those edges. This is particularly important in low luma, e.g., where small differences in video values are most visible.

In one embodiment, when the converted, non-integer pixel value (e.g., 8-bits wide) is within a first range (e.g., about 20 values) at a first end (e.g., full black end) of converted depth (e.g., 8-bits wide) of pixel values, the modifying biases the same, non-integer pixel value to the same, integer pixel value nearer to the first end, for example, modifying a converted value of 16.5 (from 66 in source format divided by 4) to 16 instead of rounding up to 17. In one embodiment, when the converted, non-integer pixel value (e.g., 8-bits wide) is within a second range (e.g., about 20 values) at a second, different end (e.g., full white end) of converted depth (e.g., 8-bits wide) of pixel values, the modifying biases the same, non-integer pixel value to the same, integer pixel value nearer to the first end, for example, modifying a converted value of 230.25 (from 921 in source format divided by 4) to 231 instead of rounding down to 230. Thus, in low luma range, certain embodiments herein more aggressively ensure areas are either fully flat or evenly textured. This can be tied to metadata sent (e.g., for the source format) to the encoder to adjust parameters to ensure that there is not visible blocking (e.g., in black).

The above is applicable to both images and video. In the case of video, certain embodiments herein also have inter-frame differences to account for. When an area is nearly flat across frames (e.g., when it is similar in those frames), certain embodiments herein determine which areas should be kept flat across frames and/or which should have consistent dithering texture to maintain visual coherency. For example, such that having identical flat areas makes for optimal encoding efficiency and a clean appearance when appropriate.

Feedback from the encoder, for example in a quantization step, may be used to drive making optimally efficient choices for encoding. For example, using the same dithering pattern in the same or different locations on the frame may serve as more efficient predictors for future frames.

The examples herein generally discuss a luma component of a set of color space components, but it should be understood that the disclosure herein is applicable to other components of the set of color space components (e.g., chrominance components, such as, but not limited to, blue chrominance and red chrominance).

For example, "YUV" is a color space (e.g., color encoding scheme) that may be used as part of a color image pipeline. In certain embodiments, the selected color space encodes a color image or video taking human perception into account, allowing reduced bandwidth for chrominance components, and generally enabling transmission errors or compression artifacts to be more efficiently masked by the human perception than using a "direct" red green blue (RGB) representation. A color space may encode brightness information (e.g., luma component Y) separately from color information (e.g., chrominance components U and V). YUV may be used as a general term encompassing (i) YUV-analog phase alternating line (PAL) encoding, (ii) YIQ-analog national television system committee (NTSC) encoding, and (iii) YCbCr-digital encoding.

Original black and white TV was broadcast by transmitting an analog signal representing just the luminance of the image. When color was introduced into television, the black and white luma system was not just thrown away. Chrominance (or color) information (e.g., designated as U and V) was added separately via a sub-carrier so that a black-and-white receiver would still be able to receive and display a color picture transmission in the receiver's native black-and-white format. In certain embodiments, U and V components provide color information and are color difference signals of blue minus luma (e.g., B−Y) and red minus luma (e.g., R−Y).

Y prime (Y') generally refers to a gamma compressed luminance Y (e.g., Y' being referred to as the "luma" component) (the brightness) and U and V are the chrominance (color) components, e.g., with "luminance" Y referring to physical linear-space brightness, while "luma" Y' referring to (e.g., non-linear) perceptual brightness.

In certain embodiments, a YPbPr color space is used in analog component video and its digital version YCbCr is used in digital video, e.g., where Cb/Pb and Cr/Pr are deviations from grey on blue-yellow and red-cyan axes, respectively, whereas U and V are blue-luminance and red-luminance differences, respectively.

A video encoder herein may operate according to a video encoding standard. In one embodiment, the video encoding standard is an Advanced Video Coding (AVC) standard, for example, a H.264 standard or a H.265 standard.

FIG. 1 is a diagram illustrating an environment 100 including a content delivery system/service 102, having a video encoder 110 with a dithering service 114 including a psychovisually optimized dithering mode 112, to send the encoded media file to a viewer device 122 according to some embodiments. Encoding system/service 106 may operate in accordance with a video encoding standard.

Encoding may compress a video file (e.g., input frame(s) 108) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one embodiment, each single I-frame includes a plurality of inter-coded frames (e.g., P-frames and/or B-frames), e.g., as a group of pictures (GOP).

Encoding may include dithering service 114 to dither certain pixel values of input frame 108 (e.g., and flatten (e.g., not dither) other pixel values of input frame 108), for example, after converting of pixel values of input frame 108 from a source format (e.g., 10-bits wide) to an output format (e.g., 8-bits wide). In one embodiment, this conversion (e.g., and any dithering by dithering service 114) occurs before encoding.

Embodiments herein provide for a mode 112 that preserves the psychovisual characteristics of the source. In certain embodiments, where a (e.g., 10-bit) source image (of frame 108) has a flat area without texturing (e.g., all the (e.g., luminance) pixel values are the same), content delivery service/system 102 (e.g., dithering service 114 thereof) rounds the source values to the same (e.g., nearest) integer (e.g., mod 4) value so that the (e.g., not yet encoded and/or encoded) output pixels will also be flat when in the psychovisually optimized dithering mode 112. In certain embodiments, dithering service 114 detects a (e.g., flat) region without texturing and a (e.g., non-flat) region with texturing in an image (e.g., frame 108 of a video), and dithers pixel values in the non-flat region and flattens (e.g., does not dither) pixel values in the flat region.

An encoding algorithm (e.g., specified by a video encoding standard) may select between inter and intra coding for (e.g., block-shaped) regions of each picture (e.g., frame 108). In certain embodiments, inter coding (e.g., as indicated by an "inter" mode) uses motion vectors for (e.g., block-based) inter prediction from other pictures (e.g., frames) to exploit temporal statistical dependencies between different pictures. Reference pictures (e.g., reference frames) may be stored in a reference picture buffer in encoding system/service 106. In certain embodiments, intra coding uses various spatial predictions to exploit spatial statistical dependencies in the source signal for a single picture (e.g., frame). In certain embodiments, motion vectors and intra prediction modes are specified for a variety of block sizes in the picture. In certain embodiments, the prediction residual is then further compressed using a transform to remove spatial correlation inside the transform block before it is quantized, producing an irreversible process that typically discards less important visual information while forming a close approximation to the source samples. In certain embodiments, the motion vectors or intra prediction modes are combined with the quantized transform coefficient information and encoded, e.g., using either variable length coding or arithmetic coding.

An encoding mode (e.g., to be used to encode a particular macroblock of a frame) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode. An inter mode (e.g., sub-mode) may include a (e.g., luminance) block partition size, e.g., 16×16, 16×8, 8×16, or 8×8 (pixels×pixels). An inter mode may use a transform, e.g., a 4×4 transform or 8×8 transform. An intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs).

In certain embodiments, encoding system/service 106 includes a field, that when set, causes entry to psychovisually optimized dithering mode 112. In one embodiment, storing a first value into field for psychovisually optimized dithering mode 112 causes the dithering service 114 to dither certain pixel values of input frame 108 (e.g., and flatten (e.g., not dither) other pixel values of input frame 108), for example, after converting of pixel values of input frame 108 from a source format (e.g., 10-bits wide) to an output format (e.g., 8-bits wide). In one embodiment, this conversion (e.g., and any dithering by dithering service 114) occurs before encoding.

The depicted content delivery system/service 102 includes a content data store 104, which may be implemented in one or more data centers. In one embodiment, the media file (e.g., video file that is to be viewed by the viewer device 122) is accessed (for example, from the content data store 104 or directly from a content provider 136, e.g., as a live stream) by video encoder 110 (e.g., by media file (e.g., fragment) generator 118). In certain embodiments, the (e.g., client) viewer device 122 requesting the media file (e.g., fragment(s) of media) from content delivery system/service 102 causes the encoding system/service 106 (e.g., video encoder 110 thereof) to encode the video file, e.g., into a compressed format for transmittal on network(s) 120 to viewer device 122. In one embodiment, the media file generator 118 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

In FIG. 1, content delivery system/service 102 is coupled to viewer device 122 and user device 130 via one or more networks 120, e.g., a cellular data network or a wired or wireless local area network (WLAN).

In certain embodiments, content delivery system/service 102 (e.g., dithering service 114 thereof) is to send a query (e.g., asking if the psychovisually optimized dithering mode 112 is desired) to user (e.g., operator) device 130, for example, and the user device 130 (e.g., in response to a command from a user of the device 130) is to send a response (e.g., an indication to enter or not enter "psychovisually optimized dithering" mode 112). Depicted user device 130 includes a display 132 having a graphical user interface (GUI) 134, e.g., to display a query for dithering service 114 to enter (or not) psychovisually optimized dithering mode 112.

Depicted viewer device 122 (e.g., where the viewer is a customer of user (e.g., operator) of device 130) includes a media player 124 having a video decoder 126 to decode the media file (e.g., fragment) from the content delivery system/service 102, e.g., to display video and/or audio of the media file on display and/or audio output 128, respectively.

Figure 2:
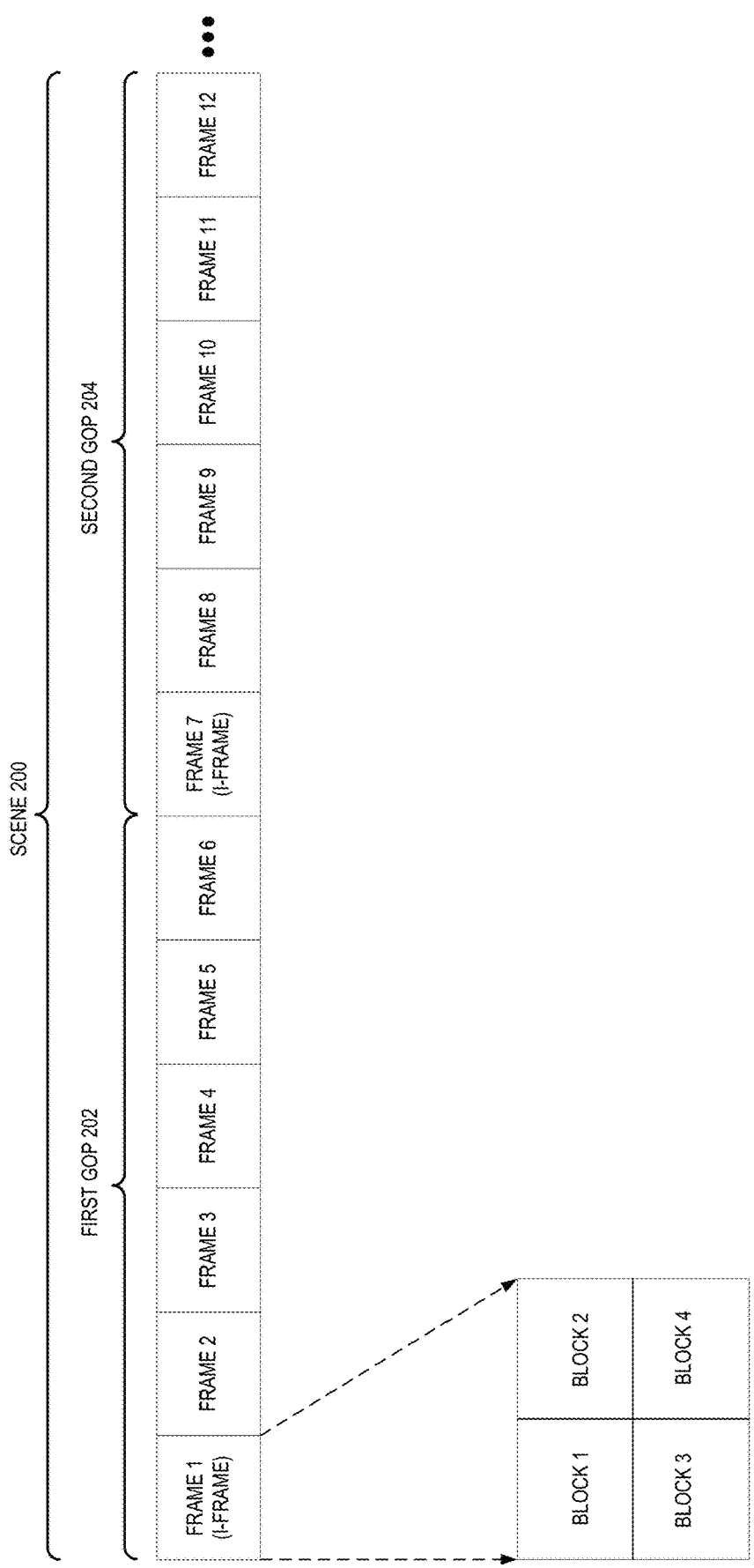
FIG. 2 is a diagram illustrating a scene having a plurality of groups of pictures, and a frame formed from a plurality of blocks (e.g., macroblocks) according to some embodiments.

FIG. 2 is a diagram illustrating a scene 200 having a plurality of groups of pictures 202, 204, and a frame (frame 1) formed from a plurality of blocks (blocks 1-4) (e.g., macroblocks) according to some embodiments. The number of scenes, GOPs (frames therein), and blocks are merely examples, e.g., it should be understood that any number of scenes, GOPs (frames therein), and blocks may be utilized.

In some embodiments, a macroblock is a proper subset of pixels of a frame used as the basic processing unit of the video encoding/decoding. An example macroblock is a (e.g., 16×16) block of (e.g., 256) luma samples and two corresponding blocks of chroma samples. A macroblock can be further partitioned for inter prediction. In one embodiment, the selection of the size of inter prediction partitions (e.g., as an encoding mode) is a result of a trade-off between the coding gain provided by using motion compensation with smaller blocks and the quantity of data needed to represent the data for motion compensation. The inter prediction process can form segmentations for motion representation that as smaller than a macroblock, e.g., as small as 4×4 luma samples in size, using motion vector accuracy of one-quarter of the luma sample grid spacing displacement. The process for inter prediction of a sample block can also involve the selection of the picture to be used as the reference picture from a number of stored previously-decoded pictures. In certain embodiments, motion vectors are encoded differentially with respect to predicted values formed from nearby encoded motion vectors. In one embodiment, an encoder calculates appropriate motion vectors and other data elements represented in the video data stream. This motion estimation process in the encoder and/or the selection of whether to use inter prediction for the representation of each region of the video content may be specified by an encoding standard.

In certain embodiments, each pixel value in a frame is converted from a first format (e.g., corresponding to a value scale of a given bit depth) to a second, different format (e.g., corresponding to a different value scale of a different, given bit depth), for example, pixel values converted from 10-bit wide values to 8-bit wide values.

Figure 3:
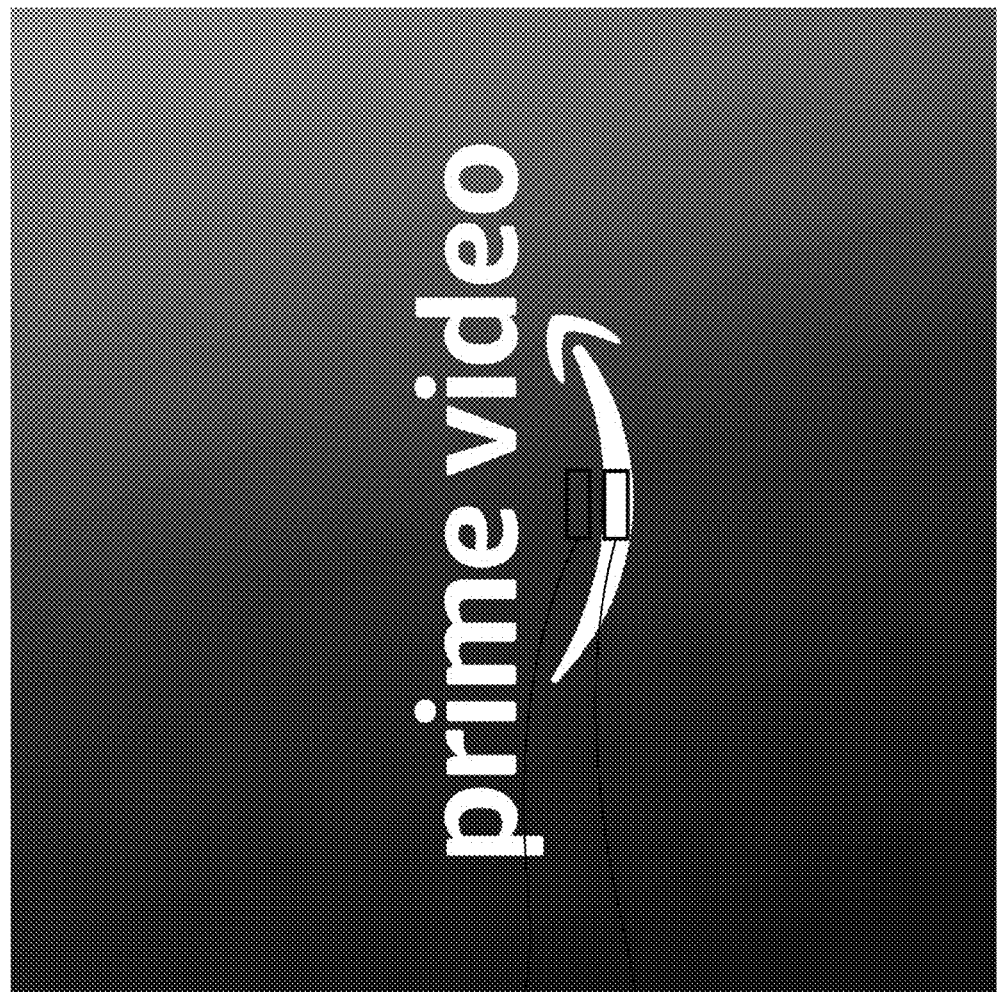
FIG. 3 is a diagram illustrating an input image (e.g., frame) having a non-flat region and a flat region according to some embodiments.

FIG. 3 is a diagram illustrating an input image 108 (e.g., frame) having a non-flat region 302 and a flat region 304 according to some embodiments. In certain embodiments, content delivery system/service 102 (e.g., encoding system/service 106 thereof) is to identify non-flat region 302 (e.g., as a region with texture)(e.g., as a region having different pixel values therein) and a flat region 304 (e.g., as a region without texture)(e.g., as a region having the same or substantially the same pixel values therein). In one embodiment, a flat region has a mean variance of the pixel values versus their neighbors that averages more than a threshold (e.g., one bit) either in the source or output color volume. In some embodiments, texture comprises a set of texture elements (texels) occurring in some regular or repeated pattern. In certain embodiments, regions are determined during texture mapping by the content delivery system/service 102.

Figure 4:
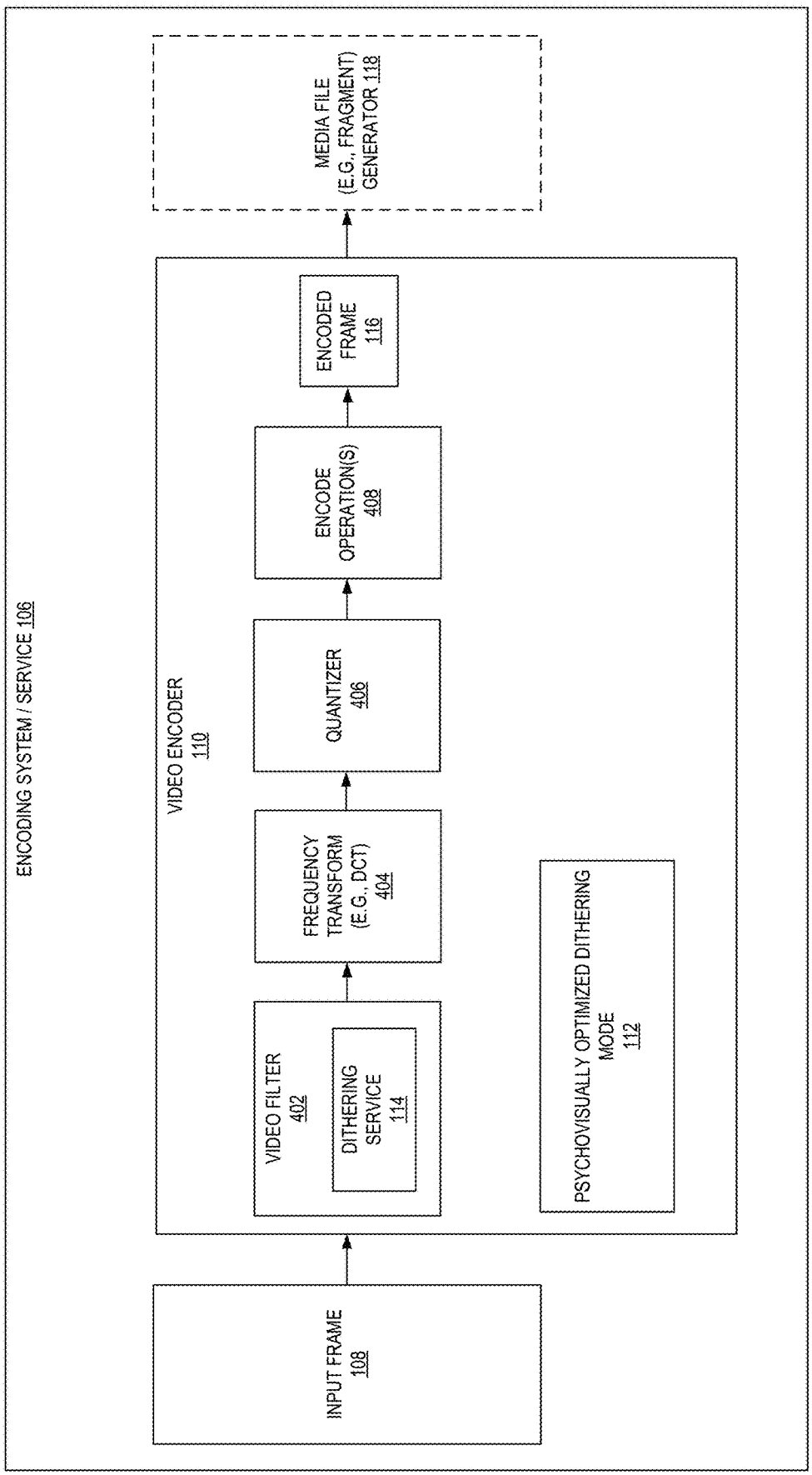
FIG. 4 is a diagram illustrating a video encoder with a dithering service including a psychovisually optimized dithering mode according to some embodiments.

FIG. 4 is a diagram illustrating a video encoder 110 with a dithering service 114 including a psychovisually optimized dithering mode 112 according to some embodiments. Depicted video encoder 110 includes a video filter 402 (which may include dithering service 114). Video filter 402 may cause a reduction in data, e.g., to filter an image (e.g., macroblock thereof) with different subsampling (e.g., chroma subsampling in a (e.g., YCbCr) color space). For example, subsampling formats known as 4:4:4, 4:2:2, and 4:2:0 video, where 4:4:4 is full bandwidth Y:Cb:Cr video (respectively) and each macroblock consists of 4 Y blocks, 4 Cb blocks, and 4 Cr blocks, 4:2:2 containing half as much chrominance information as 4:4:4, and 4:2:0 containing one quarter of the chrominance information.

In certain embodiments herein, a (e.g., chroma subsampled or non-subsampled) value is converted from a first format (e.g., corresponding to a value scale of a given bit depth) to a second, different format (e.g., corresponding to a different value scale of a different, given bit depth), for example, pixel values converted from 10-bit wide values to 8-bit wide values. In certain embodiments, dithering service 114 performs psychovisually optimized dithering (e.g., when mode 112 is set) before actual encoding (e.g., before encode operations(s) 408). In certain embodiments, the pixel values output from video filter 402 are input into frequency transform 404 component that performs an invertible transform to concentrate randomness into fewer, decorrelated parameters, e.g., the discrete cosine transform (DCT). In certain embodiments, the output (e.g., coefficients) from frequency transform 404 is quantized by quantizer 406 component (e.g., according to a corresponding quantization matrix). In certain embodiments, the output (e.g., quantized coefficients) from the quantizer 406 is then encoded by encoding operation(s) 408 to generate encoded frame 116.

Figure 5:
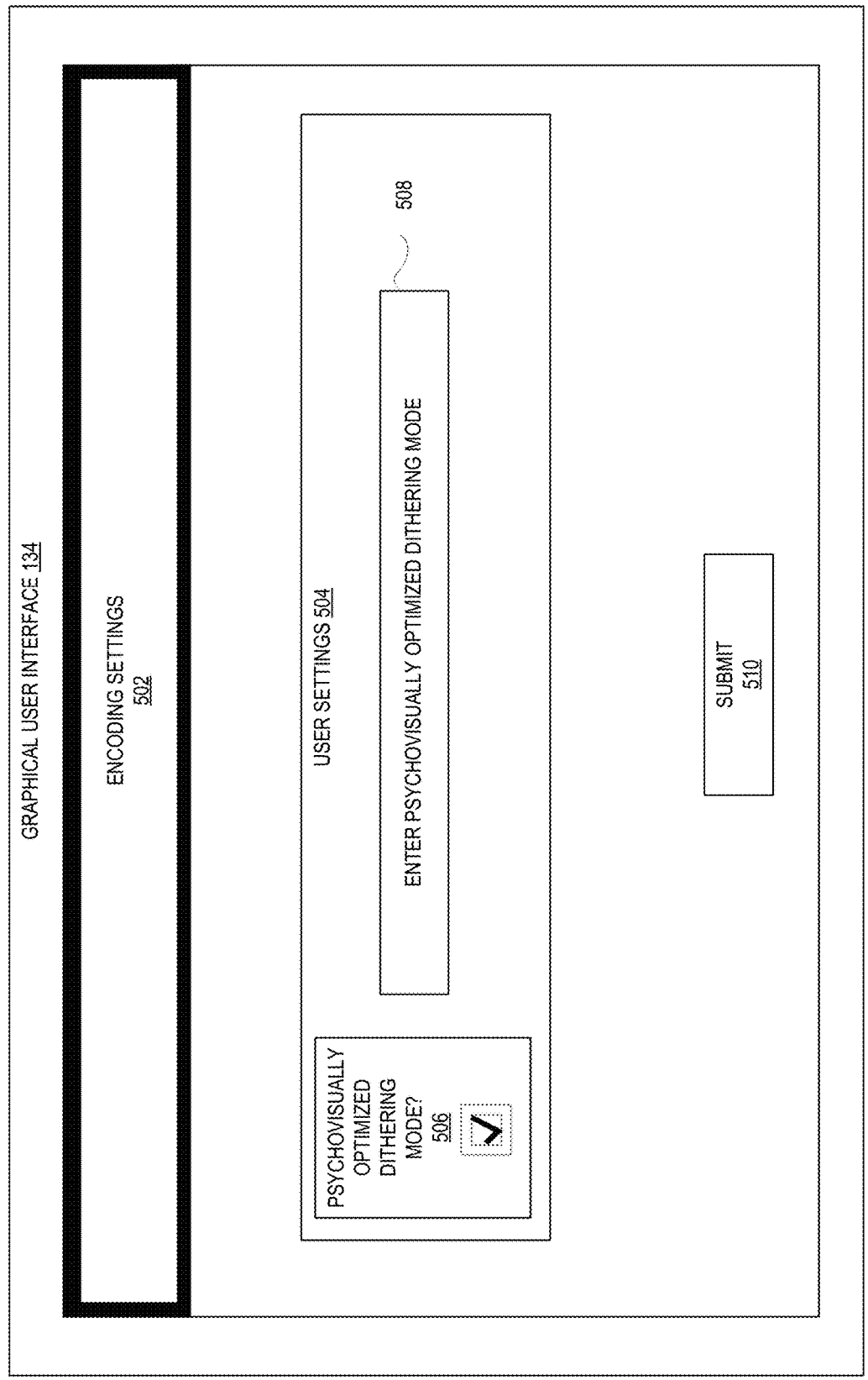
FIG. 5 is a diagram illustrating a graphical user interface for setting an encoder to a psychovisually optimized dithering mode according to some embodiments.

FIG. 5 is a diagram illustrating a graphical user interface 134 for setting an encoder to a psychovisually optimized dithering mode 114 according to some embodiments. Depicted graphical user interface 134 includes a field 502 that is customizable with text to indicate that these are encoding settings, a field 504 that is customizable with text to indicate that these are video (or image) encoding settings, an interface element 506 that, when selected, will cause the content delivery system/service to enter psychovisually optimized dithering mode 114, and a field 508 that is customizable with text to indicate that selecting the interface element 506 is to cause entry into psychovisually optimized dithering mode. A user may click the submit interface element 510 to (e.g., cause a command to be sent that causes) entry of a content delivery system/service into psychovisually optimized dithering mode (e.g., psychovisually optimized dithering mode 114 in FIGS. 1, 4, and 6). An interface element, may include, but is not limited to, a thumbs up (or down), checkbox, button, dropdown menu, etc.

Figure 6:
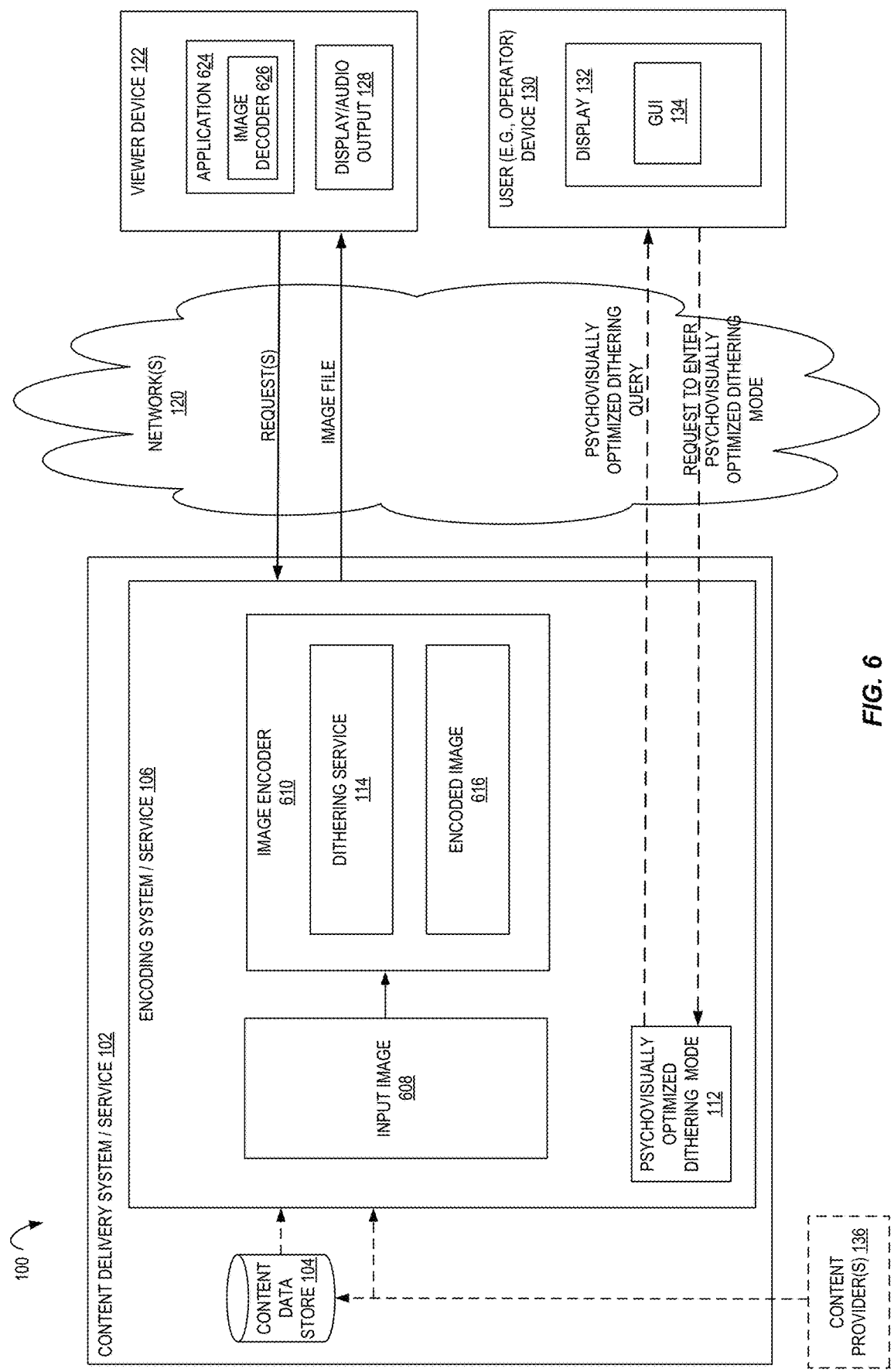
FIG. 6 is a diagram illustrating an environment including a content delivery system/service, having an image encoder with a dithering service including a psychovisually optimized dithering mode, to send the encoded image to a viewer device according to some embodiments.

FIG. 6 is a diagram illustrating an environment 100 including a content delivery system/service 102, having an image encoder 610 with a dithering service 114 including a psychovisually optimized dithering mode 112, to send the encoded image to a viewer device 122 according to some embodiments. Encoding system/service 106 may operate in accordance with an image encoding standard. Encoding may compress an image file (e.g., input image 608) into an encoded (e.g., compressed) image 616.

Encoding may include dithering service 114 to dither certain pixel values of input image 608 (e.g., and flatten (e.g., not dither) other pixel values of input image 608), for example, after converting of pixel values of input image 608 from a source format (e.g., 10-bits wide) to an output format (e.g., 8-bits wide). In one embodiment, this conversion (e.g., and any dithering by dithering service 114) occurs before encoding.

Embodiments herein provide for a mode 112 that preserves the psychovisual characteristics of the source. In certain embodiments, where a (e.g., 10-bit) source input image 608 has a flat area without texturing (e.g., all the (e.g., luminance) pixel values are the same), content delivery service/system 102 (e.g., dithering service 114 thereof) rounds the source values to the same (e.g., nearest) integer (e.g., mod 4) value so that the (e.g., not yet encoded and/or encoded) output pixels will also be flat when in the psychovisually optimized dithering mode 112. In certain embodiments, dithering service 114 detects a (e.g., flat) region without texturing and a (e.g., non-flat) region with texturing in input image 608, and dithers pixel values in the non-flat region and flattens (e.g., does not dither) pixel values in the flat region.

An encoding algorithm (e.g., specified by an image encoding standard) may select the encoding operation(s) for (e.g., block-shaped) regions of each image 608. Encoding operations may include one or more of a color transform, a frequency transform (e.g., discrete cosine transform), quantization, and an encoding (e.g., according to a compression standard, such as, but not limited to, a Huffman encoding standard).

In certain embodiments, encoding system/service 106 includes a field, that when set, causes entry to psychovisually optimized dithering mode 112. In one embodiment, storing a first value into field for psychovisually optimized dithering mode 112 causes the dithering service 114 to dither certain pixel values of input image 608 (e.g., and flatten (e.g., not dither) other pixel values of input image 608), for example, after converting of pixel values of input image 608 from a source format (e.g., 10-bits wide) to an output format (e.g., 8-bits wide). In one embodiment, this conversion (e.g., and any dithering by dithering service 114) occurs before encoding.

The depicted content delivery system/service 102 includes a content data store 104, which may be implemented in one or more data centers. In one embodiment, the input image 608 (e.g., image that is to be viewed by the viewer device 122) is accessed (for example, from the content data store 104 or directly from a content provider 136) by image encoder 610. In certain embodiments, the (e.g., client) viewer device 122 requesting the image from content delivery system/service 102 causes the encoding system/service 106 (e.g., image encoder 610 thereof) to encode the image 608, e.g., into a compressed format for transmittal on network(s) 120 to viewer device 122.

In FIG. 6, content delivery system/service 102 is coupled to viewer device 122 and user device 130 via one or more networks 120, e.g., a cellular data network or a wired or wireless local area network (WLAN).

In certain embodiments, content delivery system/service 102 (e.g., dithering service 114 thereof) is to send a query (e.g., asking if the psychovisually optimized dithering mode 112 is desired) to user (e.g., operator) device 130, for example, and the user device 130 (e.g., in response to a command from a user of the device 130) is to send a response (e.g., an indication to enter or not enter "psychovisually optimized dithering" mode 112). Depicted user device 130 includes a display 132 having a graphical user interface (GUI) 134, e.g., to display a query for dithering service 114 to enter (or not) psychovisually optimized dithering mode 112.

Depicted viewer device 122 (e.g., where the viewer is a customer of user (e.g., operator) of device 130) includes a (e.g., software) application 624 having an image decoder 626 to decode the encoded image from the content delivery system/service 102, e.g., to display the image on display 128.

Figure 7:
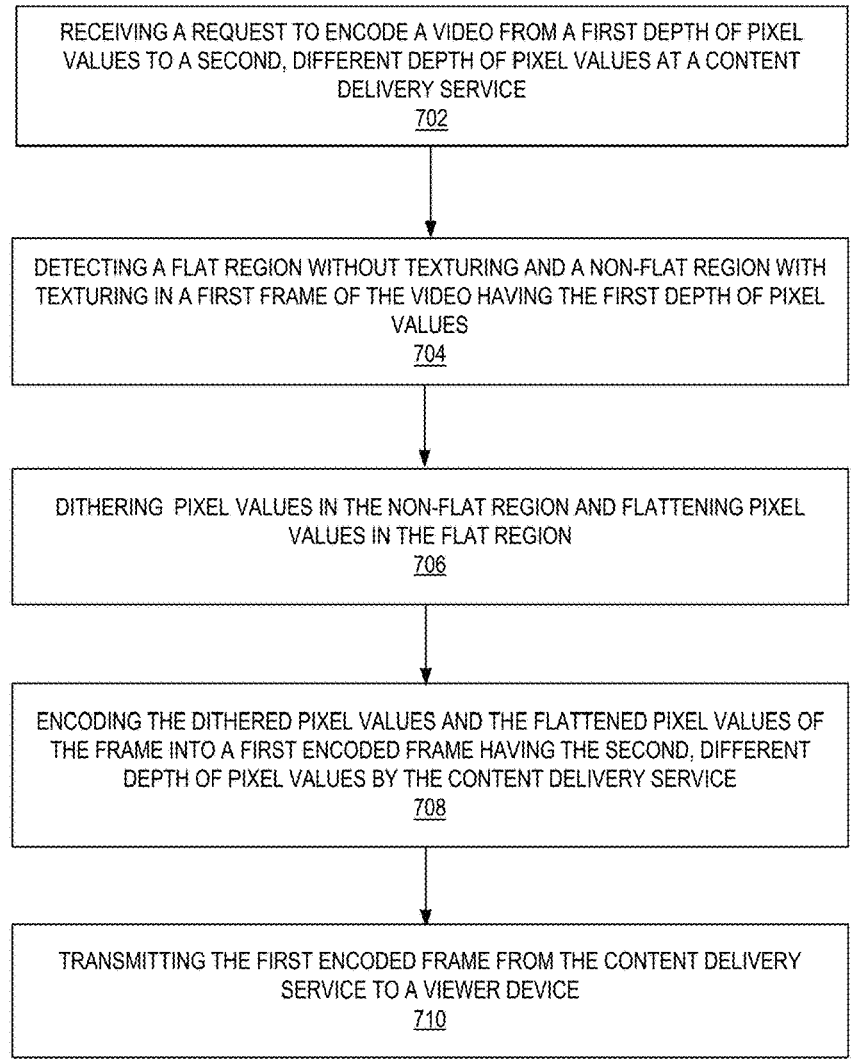
FIG. 7 is a flow diagram illustrating operations of a method for selectively dithering pixel values in a video frame and encoding the selectively dithered pixel values according to some embodiments.

FIG. 7 is a flow diagram illustrating operations 700 of a method for selectively dithering pixel values in a video frame and encoding the selectively dithered pixel values according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by content delivery system/service (or a component thereof) of the other figures.

The operations 700 include, at block 702, receiving a request to encode a video from a first depth of pixel values to a second, different depth of pixel values at a content delivery service. The operations 700 further include, at block 704, detecting a flat region without texturing and a non-flat region with texturing in a first frame of the video having the first depth of pixel values. The operations 700 further include, at block 706, dithering pixel values in the non-flat region and flattening pixel values in the flat region. The operations 700 further include, at block 708, encoding the dithered pixel values and the flattened (e.g., not dithered) pixel values of the frame into a first encoded frame having the second, different depth of pixel values by the content delivery service. The operations 700 further include, at block 710, transmitting the first encoded frame from the content delivery service to a viewer device.

Figure 8:
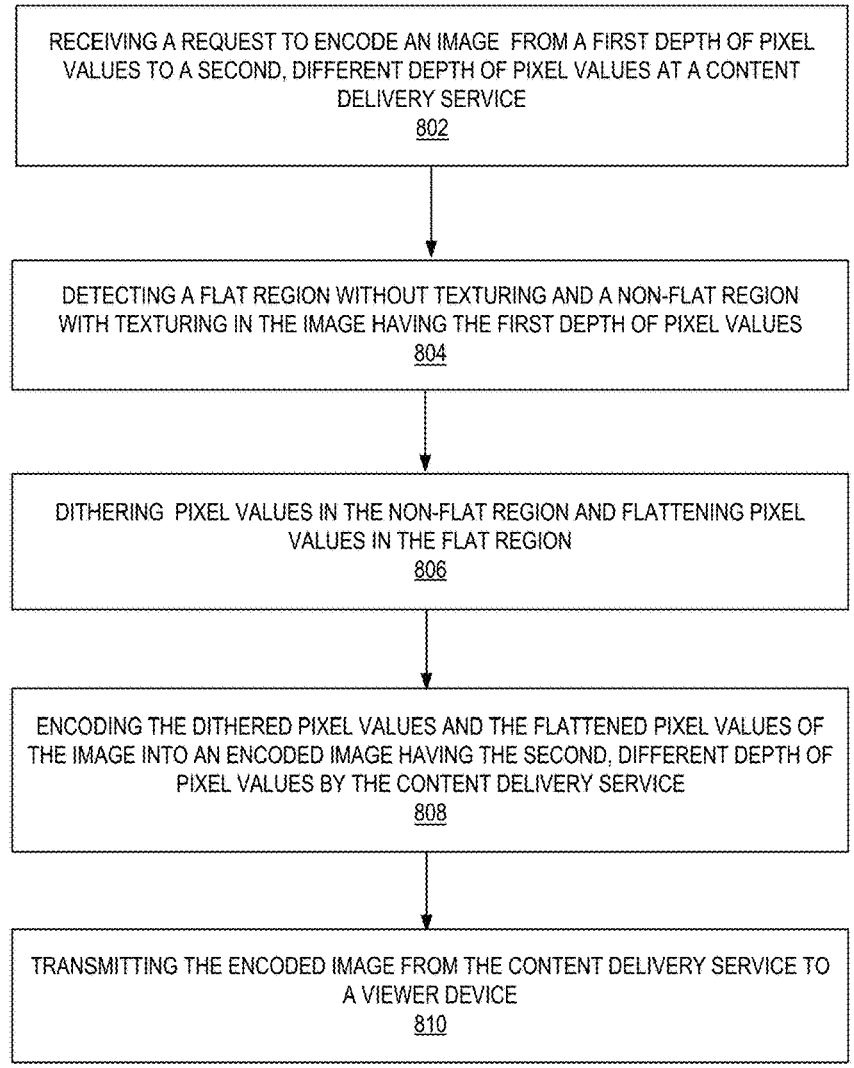
FIG. 8 is a flow diagram illustrating operations of a method for selectively dithering pixel values in an image and encoding the selectively dithered pixel values according to some embodiments.

FIG. 8 is a flow diagram illustrating operations 800 of a method for selectively dithering pixel values in an image and encoding the selectively dithered pixel values according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by content delivery system/service (or a component thereof) of the other figures.

The operations 800 include, at block 802, receiving a request to encode an image from a first depth of pixel values to a second, different depth of pixel values at a content delivery service. The operations 800 further include, at block 804, detecting a flat region without texturing and a non-flat region with texturing in the image having the first depth of pixel values. The operations 800 include, at block 806, dithering pixel values in the non-flat region and flattening pixel values in the flat region. The operations 800 include, at block 808, encoding the dithered pixel values and the flattened (e.g., not dithered) pixel values of the image into an encoded image having the second, different depth of pixel values by the content delivery service. The operations 800 include, at block 810, transmitting the encoded image from the content delivery service to a viewer device.

Exemplary environments, systems, etc. that the above may be used in are detailed below.

At least some embodiments of the disclosed technologies can be described in view of the following examples:

Example 1

A computer-implemented method comprising:
receiving a request to encode a video from a first depth of pixel values to a second, different depth of pixel values at a content delivery service;
detecting a flat region without texturing and a non-flat region with texturing in a first frame of the video having the first depth of pixel values;
dithering pixel values in the non-flat region and flattening pixel values in the flat region;

encoding the dithered pixel values and the flattened pixel values of the frame into a first encoded frame having the second, different depth of pixel values by the content delivery service; and transmitting the first encoded frame from the content delivery service to a viewer device.

Example 2

The computer-implemented method of example 1, wherein the flattening comprises converting each same pixel value of the flat region without texturing of the first depth of pixel values to a same, non-integer pixel value of the second, different depth of pixel values; and modifying the same, non-integer pixel values of the second, different depth of pixel values to a same, integer pixel value of the second, different depth of pixel values.

Example 3

The computer-implemented method of example 1, further comprising:
detecting a similar flat region without texturing in a second frame of the video having the first depth of pixel values;
outputting a same, integer pixel value of the second, different depth of pixel values of the flat region in the first frame for each pixel in the similar flat region in the second frame; and
encoding the same, integer pixel value of the second, different depth of pixel values for each pixel in the similar flat region in the second frame into a second encoded frame having the second, different depth of pixel values by the content delivery service.

Example 4

A computer-implemented method comprising:
receiving a request to encode an image from a first depth of pixel values to a second, different depth of pixel values at a content delivery service;
detecting a flat region without texturing and a non-flat region with texturing in the image having the first depth of pixel values;
dithering pixel values in the non-flat region and flattening pixel values in the flat region;
encoding the dithered pixel values and the flattened pixel values of the image into an encoded image having the second, different depth of pixel values by the content delivery service; and
transmitting the encoded image from the content delivery service to a viewer device.

Example 5

The computer-implemented method of example 4, wherein the image is a first frame of a video having the first depth of pixel values.

Example 6

The computer-implemented method of example 5, further comprising:
detecting a similar flat region without texturing in a second frame of the video having the first depth of pixel values;
outputting a same, integer pixel value of the second, different depth of pixel values of the flat region in the first frame for each pixel in the similar flat region in the second frame; and encoding the same, integer pixel value of the second, different depth of pixel values for each pixel in the similar flat region in the second frame into a second encoded frame having the second, different depth of pixel values by the content delivery service.

Example 7

The computer-implemented method of example 4, wherein the flattening comprises converting each same pixel value of the flat region without texturing of the first depth of pixel values to a same, non-integer pixel value of the second, different depth of pixel values; and modifying the same, non-integer pixel values of the second, different depth of pixel values to a same, integer pixel value of the second, different depth of pixel values.

Example 8

The computer-implemented method of example 7, wherein the same, integer pixel value is a nearest integer value to the same, non-integer pixel value.

Example 9

The computer-implemented method of example 7, further comprising, when the same, non-integer pixel value is within a first range at a first end of the second, different depth of pixel values, the modifying biases the same, non-integer pixel value to the same, integer pixel value nearer to the first end.

Example 10

The computer-implemented method of example 9, further comprising, when the same, integer pixel value is within a second range at a second, different end of the second, different depth of pixel values, the modifying biases the same, non-integer pixel value to the same, integer pixel value nearer to the second, different end.

Example 11

The computer-implemented method of example 7, wherein the encoding is performed according to an encoding standard that does not support encoding non-integer pixel values.

Example 12

The computer-implemented method of example 4, wherein the second, different depth of pixel values is smaller than the first depth of pixel values.

Example 13

The computer-implemented method of example 12, wherein the first depth of pixel values is ten bits and the second, different depth of pixel values is eight bits.

Example 14

The computer-implemented method of example 4, wherein the first depth of pixel values and the second, different depth of pixel values are luminance pixel values.

Example 15

A system comprising:
a content data store to store an image; and one or more electronic devices to implement a content delivery service, the content delivery service including instructions that upon execution cause the content delivery service to perform operations comprising:

receiving a request to encode the image from a first depth of pixel values to a second, different depth of pixel values at a content delivery service, detecting a flat region without texturing and a non-flat region with texturing in the image having the first depth of pixel values, dithering pixel values in the non-flat region and flattening pixel values in the flat region, encoding the dithered pixel values and the flattened pixel values of the image into an encoded image having the second, different depth of pixel values by the content delivery service, and transmitting the encoded image from the content delivery service to a viewer device.

Example 16

The system of example 15, wherein the instructions upon execution cause the content delivery service to perform operations wherein the flattening comprises converting each same pixel value of the flat region without texturing of the first depth of pixel values to a same, non-integer pixel value of the second, different depth of pixel values; and modifying the same, non-integer pixel values of the second, different depth of pixel values to a same, integer pixel value of the second, different depth of pixel values.

Example 17

The system of example 16, wherein the instructions upon execution cause the content delivery service to perform operations further comprising, when the same, non-integer pixel value is within a first range at a first end of the second, different depth of pixel values, the modifying biases the same, non-integer pixel value to the same, integer pixel value nearer to the first end.

Example 18

The system of example 17, wherein the instructions upon execution cause the content delivery service to perform operations further comprising, when the same, integer pixel value is within a second range at a second, different end of the second, different depth of pixel values, the modifying biases the same, non-integer pixel value to the same, integer pixel value nearer to the second, different end.

Example 19

The system of example 15, wherein the instructions upon execution cause the content delivery service to perform operations wherein the encoding is performed according to an encoding standard that does not support encoding non-integer pixel values.

Example 20

The system of example 15, wherein the first depth of pixel values and the second, different depth of pixel values are luminance pixel values.

Figure 9:
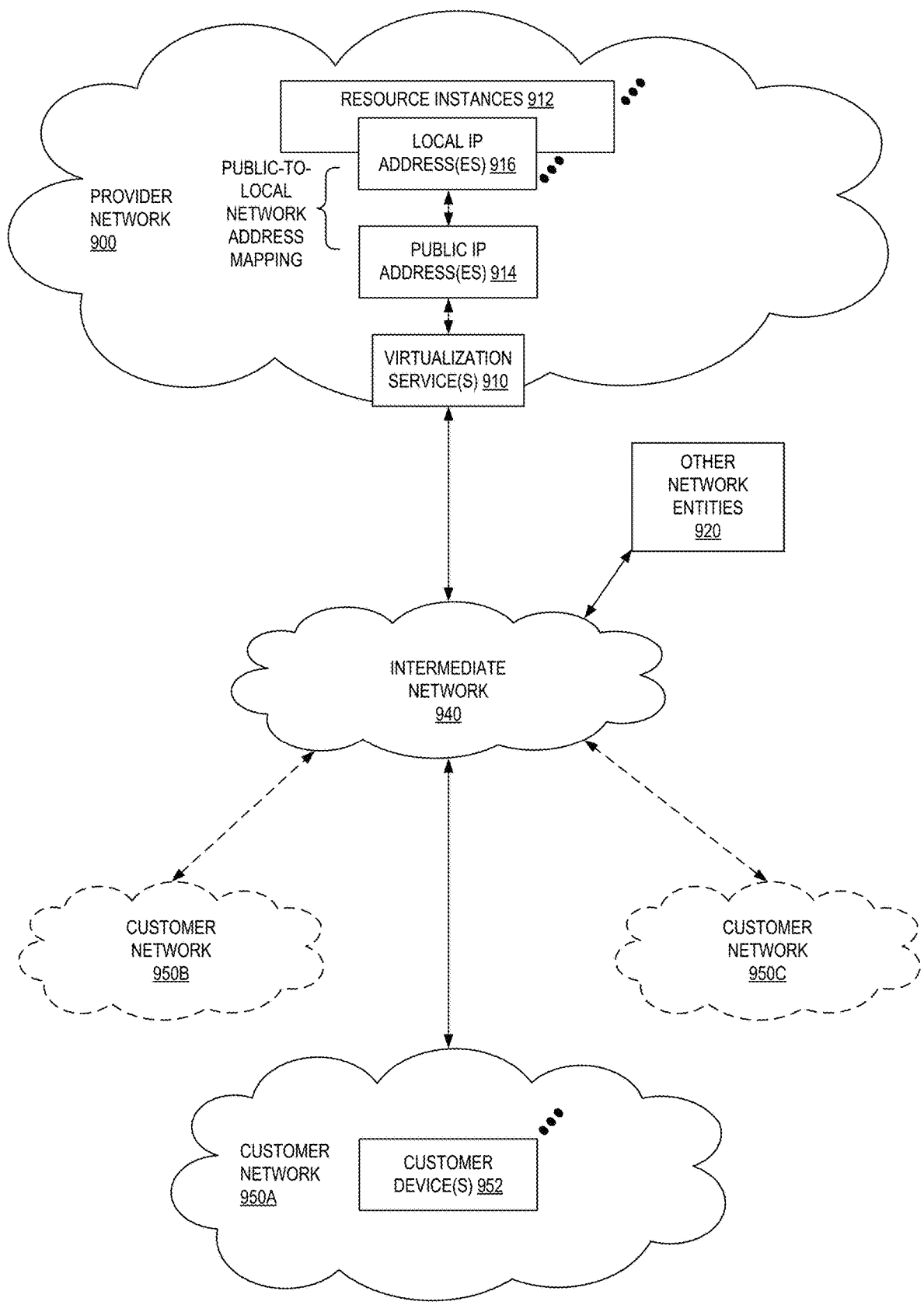
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
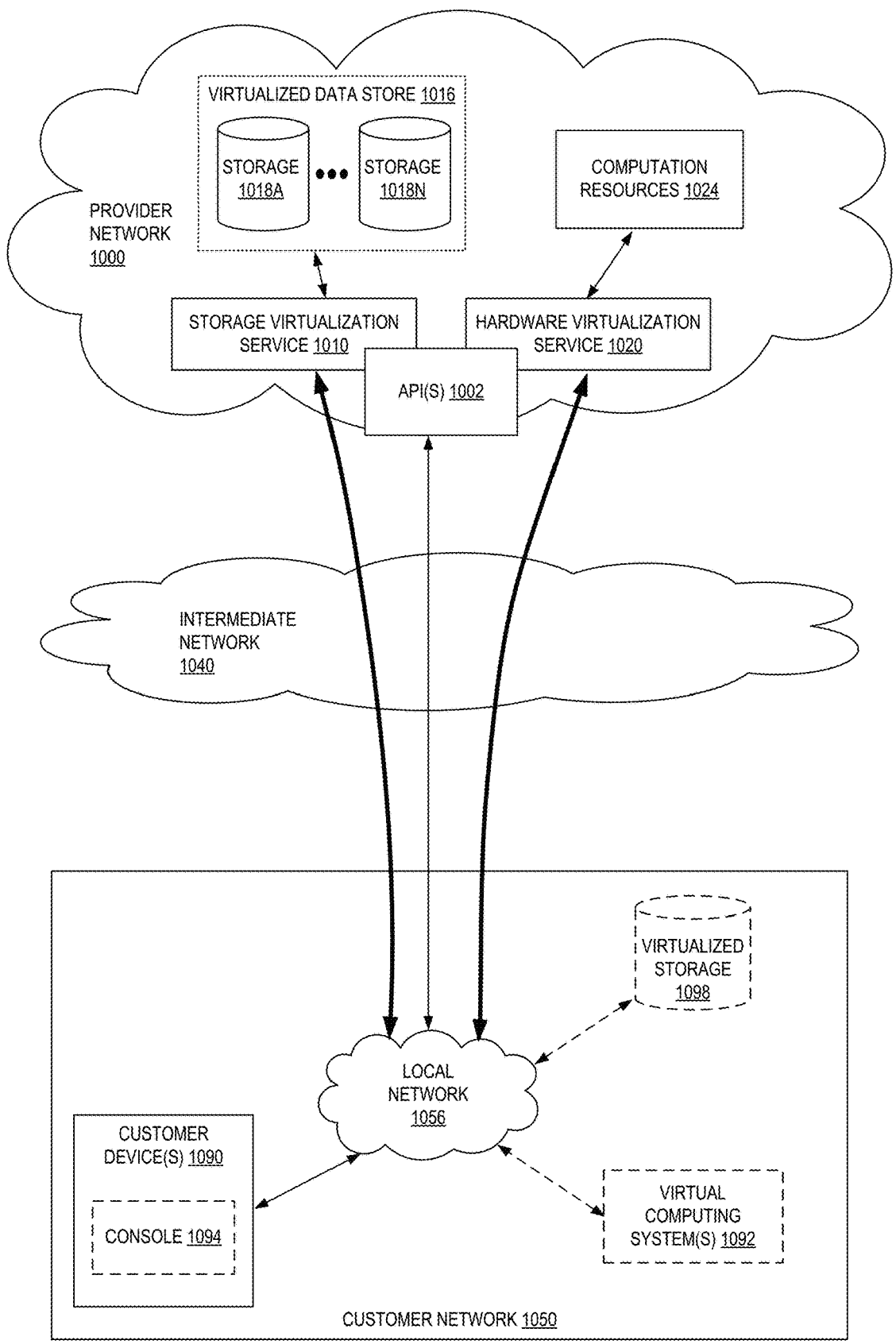
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
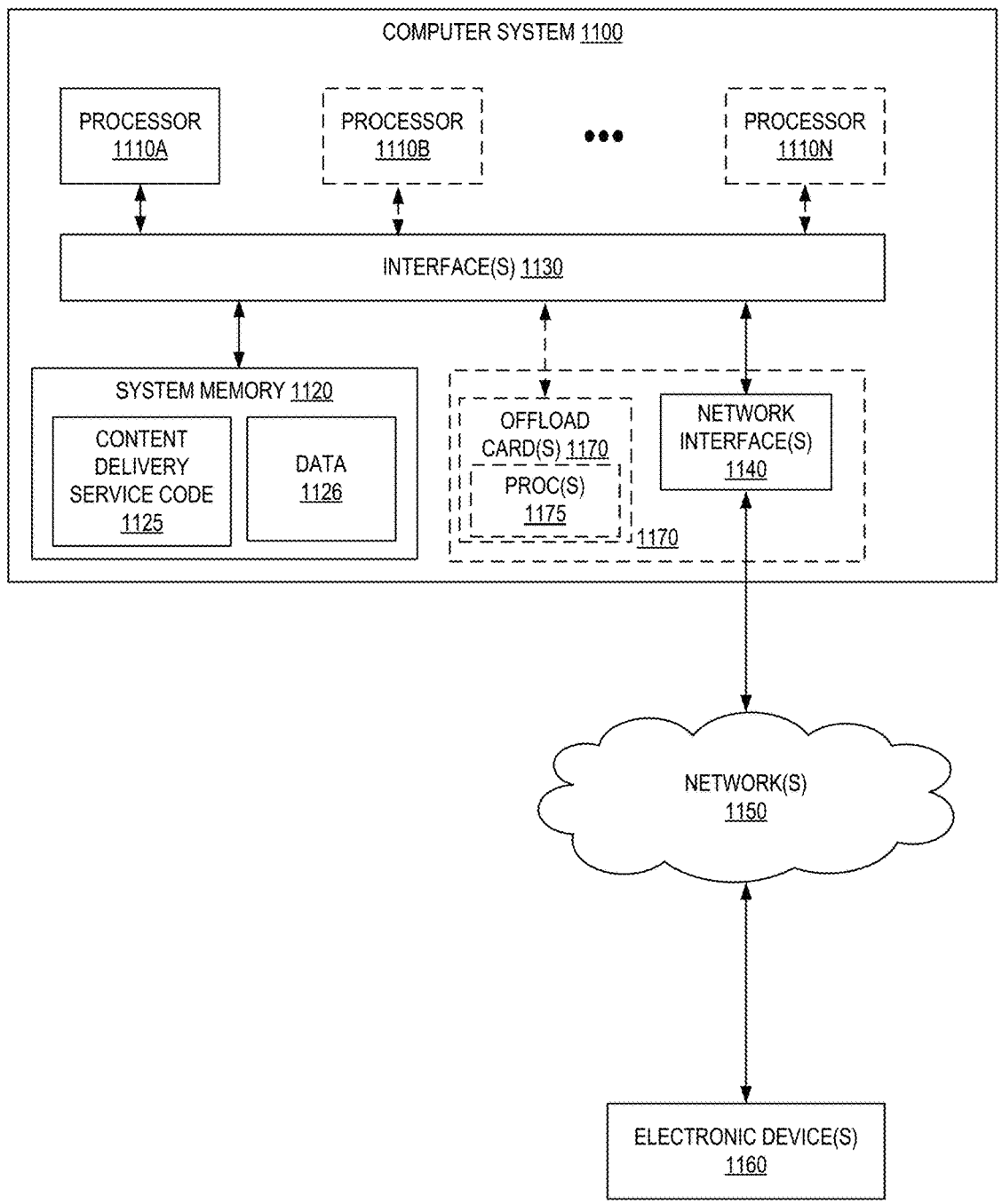
FIG. 11 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as content delivery service code 1125 (e.g., executable to implement, in whole or in part, the content delivery service 102) and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
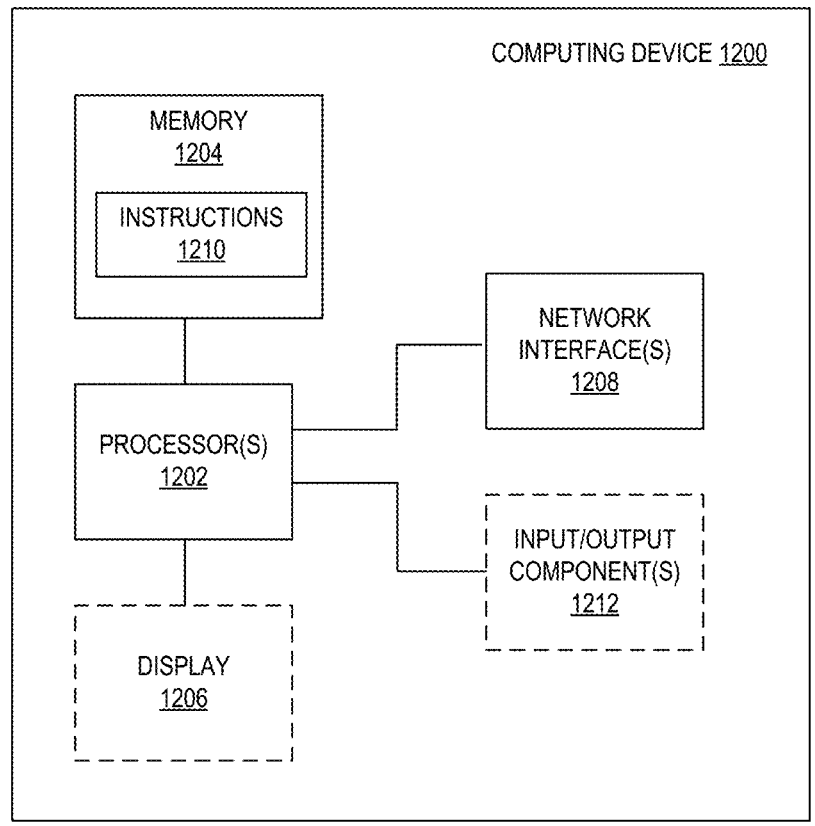
FIG. 12 illustrates a logical arrangement of a set of general components of an exemplary computing device that can be utilized in accordance with various embodiments.

FIG. 12 illustrates a logical arrangement of a set of general components of an example computing device 1200. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (for example, instructions 1210, e.g., which implement a content delivery service as disclosed herein), and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1210) for execution on the set of one or more processors 1202 of that electronic device. One or more parts of various embodiments may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some embodiments include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 13:
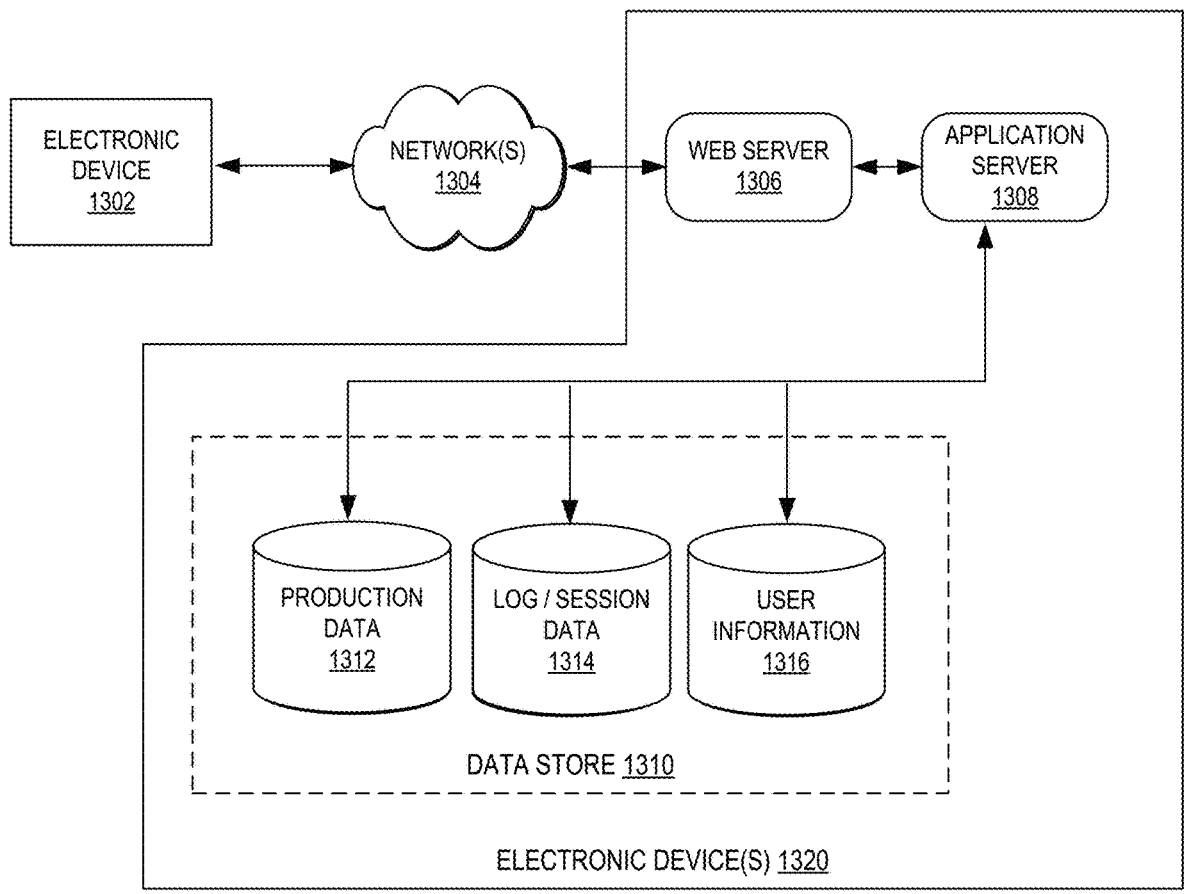
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. For example, in some embodiments messages are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various embodiments. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to encode a video from a first depth of pixel values to a second, different depth of pixel values at a content delivery service;
   detecting a flat region without texturing and a non-flat region with texturing in a first frame of the video having the first depth of pixel values;
   dithering pixel values in the non-flat region and flattening, without dithering, pixel values in the flat region, wherein the flattening comprises converting each same pixel value of the flat region without texturing of the first depth of pixel values to a same, non-integer pixel value of the second, different depth of pixel values; and modifying the same, non-integer pixel values of the second, different depth of pixel values to a same, integer pixel value of the second, different depth of pixel values;
   encoding the dithered pixel values and the flattened pixel values of the frame into a first encoded frame having the second, different depth of pixel values by the content delivery service; and
   transmitting the first encoded frame from the content delivery service to a viewer device.

2. The computer-implemented method of claim 1, further comprising:
   detecting a similar flat region without texturing in a second frame of the video having the first depth of pixel values;
   outputting a same, integer pixel value of the second, different depth of pixel values of the flat region in the first frame for each pixel in the similar flat region in the second frame; and
   encoding the same, integer pixel value of the second, different depth of pixel values for each pixel in the similar flat region in the second frame into a second encoded frame having the second, different depth of pixel values by the content delivery service.

3. A computer-implemented method comprising:
   receiving a request to encode an image from a first depth of pixel values to a second, different depth of pixel values at a content delivery service;
   detecting a flat region without texturing and a non-flat region with texturing in the image having the first depth of pixel values;
   dithering pixel values in the non-flat region and flattening pixel values in the flat region, wherein the flattening comprises converting each same pixel value of the flat region without texturing of the first depth of pixel values to a same, non-integer pixel value of the second, different depth of pixel values; and modifying the same, non-integer pixel values of the second, different depth of pixel values to a same, integer pixel value of the second, different depth of pixel values;
   encoding the dithered pixel values and the flattened pixel values of the image into an encoded image having the second, different depth of pixel values by the content delivery service; and
   transmitting the encoded image from the content delivery service to a viewer device.

4. The computer-implemented method of claim 3, further comprising, when the same, non-integer pixel value is within a first range at a first end of the second, different depth of pixel values, the modifying biases the same, non-integer pixel value to the same, integer pixel value nearer to the first end.

5. The computer-implemented method of claim 4, further comprising, when the same, integer pixel value is within a second range at a second, different end of the second, different depth of pixel values, the modifying biases the same, non-integer pixel value to the same, integer pixel value nearer to the second, different end.

6. The computer-implemented method of claim 3, wherein the encoding is performed according to an encoding standard that does not support encoding non-integer pixel values.

7. The computer-implemented method of claim 3, wherein the same, integer pixel value is a nearest integer value to the same, non-integer pixel value.

8. The computer-implemented method of claim 7, wherein the image is a first frame of a video having the first depth of pixel values.

9. The computer-implemented method of claim 8, further comprising:
   detecting a similar flat region without texturing in a second frame of the video having the first depth of pixel values;
   outputting a same, integer pixel value of the second, different depth of pixel values of the flat region in the first frame for each pixel in the similar flat region in the second frame; and
   encoding the same, integer pixel value of the second, different depth of pixel values for each pixel in the similar flat region in the second frame into a second encoded frame having the second, different depth of pixel values by the content delivery service.

10. The computer-implemented method of claim 3, wherein the second, different depth of pixel values is smaller than the first depth of pixel values.

11. The computer-implemented method of claim 10, wherein the first depth of pixel values is ten bits and the second, different depth of pixel values is eight bits.

12. The computer-implemented method of claim 3, wherein the first depth of pixel values and the second, different depth of pixel values are luminance pixel values.

13. A system comprising:
   a content data store to store an image; and
   one or more electronic devices to implement a content delivery service, the content delivery service including instructions that upon execution cause the content delivery service to perform operations comprising:
      receiving a request to encode the image from a first depth of pixel values to a second, different depth of pixel values at the content delivery service,
      detecting a flat region without texturing and a non-flat region with texturing in the image having the first depth of pixel values, dithering pixel values in the non-flat region and flattening pixel values in the flat region, wherein the flattening comprises converting each same pixel value of the flat region without texturing of the first depth of pixel values to a same, non-integer pixel value of the second, different depth of pixel values; and modifying the same, non-integer pixel values of the second, different depth of pixel values to a same, integer pixel value of the second, different depth of pixel values, encoding the dithered pixel values and the flattened pixel values of the image into an encoded image having the second, different depth of pixel values by the content delivery service, and transmitting the encoded image from the content delivery service to a viewer device.

14. The system of claim 13, wherein the instructions upon execution cause the content delivery service to perform operations further comprising, when the same, non-integer pixel value is within a first range at a first end of the second, different depth of pixel values, the modifying biases the same, non-integer pixel value to the same, integer pixel value nearer to the first end.

15. The system of claim 14, wherein the instructions upon execution cause the content delivery service to perform operations further comprising, when the same, integer pixel value is within a second range at a second, different end of the second, different depth of pixel values, the modifying biases the same, non-integer pixel value to the same, integer pixel value nearer to the second, different end.

16. The system of claim 13, wherein the instructions upon execution cause the content delivery service to perform operations wherein the encoding is performed according to an encoding standard that does not support encoding non-integer pixel values.

17. The system of claim 13, wherein the first depth of pixel values and the second, different depth of pixel values are luminance pixel values.

* * * * *